(12) United States Patent
Streng (10) Patent No.: US 11,945,909 B2
(45) Date of Patent: Apr. 2, 2024

(54) PROCESS FOR PREPARING POLYCARBONATES USING A CATALYST SYSTEM HAVING A QUARTERNARY NITROGEN COMPOND AND A QUARTERNARY PHOSPHOROUS COMPOUND

(71) Applicant: EPC Engineering & Technologies GMBH, Arnstadt (DE)

(72) Inventor: Michael Streng, Maintal (DE)

(73) Assignee: EPC Engineering & Technologies GMBH, Arnstadt (DE)

( * ) Notice: Subject to any disclaimer, the term of this patent is extended or adjusted under 35 U.S.C. 154(b) by 1157 days.

(21) Appl. No.: 16/341,641

(22) PCT Filed: Oct. 12, 2017

(86) PCT No.: PCT/EP2017/076010
§ 371 (c)(1),
(2) Date: Aug. 5, 2019

(87) PCT Pub. No.: WO2018/069425
PCT Pub. Date: Apr. 19, 2018

(65) Prior Publication Data
US 2019/0367669 A1  Dec. 5, 2019

(30) Foreign Application Priority Data

Oct. 12, 2016 (DE) ...................... 10 2016 119 477.8

(51) Int. Cl.
*C08G 64/30* (2006.01)
*B01J 31/02* (2006.01)
(Continued)

(52) U.S. Cl.
CPC ........ *C08G 64/307* (2013.01); *B01J 31/0268* (2013.01); *B01J 35/0006* (2013.01);
(Continued)

(58) Field of Classification Search
CPC .... B01J 23/04; B01J 31/0225; B01J 31/0239; B01J 31/0268; B01J 35/0006; C08G 64/307
See application file for complete search history.

(56) References Cited

U.S. PATENT DOCUMENTS

2002/0095020 A1* 7/2002 Hucks ................. C08G 64/307
528/196
2009/0117314 A1  5/2009 Haese et al.

FOREIGN PATENT DOCUMENTS

CN   105683243 A   6/2016
EP   0987285 A1   3/2000
(Continued)

OTHER PUBLICATIONS

Schnell, "Chemistry and Physics of Polycarbonates, Polymer Reviews," vol. 9, Interscience Publishers, New York, London, Sydney 1964, 5 pages.
(Continued)

*Primary Examiner* — Yevgeny Valenrod
*Assistant Examiner* — Blaine G Doletski
(74) *Attorney, Agent, or Firm* — Winstead PC (57) ABSTRACT

The invention relates to a method for producing a polycarbonate and the reaction of one or more diaryl carbonates with one or more aromatic compounds, wherein a catalyst combination is used in the process. The invention further relates to a catalyst combination and to the use thereof in a process for producing a polycarbonate.

15 Claims, 2 Drawing Sheets

(51) Int. Cl.
B01J 35/00 (2006.01)
*B01J 23/04* (2006.01)

(52) U.S. Cl.
CPC ............ *B01J 23/04* (2013.01); *B01J 31/0225* (2013.01); *B01J 31/0239* (2013.01)

(56) References Cited

FOREIGN PATENT DOCUMENTS

| | | | | |
|---|---|---|---|---|
| EP | 0807657 B1 | | 5/2004 | |
| RU | 2495058 C2 | | 10/2013 | |
| WO | WO-2007024425 A2 | | 3/2007 | |
| WO | WO-2015059611 A2 | | 4/2015 | |
| WO | WO2015/155737 | * | 10/2015 | |
| WO | WO2016/151517 | * | 9/2016 | |
| WO | WO-2016151517 A1 | * | 9/2016 | ........... C08G 64/307 |

OTHER PUBLICATIONS

Prevorsek, et al., "Synthesis of Poly(ester)carbonate Copolymers", Journal of Polymer Science: Polymer Chemistry Edition, vol. 18, 75-90 (1980).
Freitag, et al., "Polycarbonates", Encyclopedia of Polymer Science and Engineering, vol. 11, second edition, 1988, pp. 648-718.
Internationale Recherchenbehörde (International Search Report) for PCT/EP2017/076010, dated Jan. 15, 2018.
Office Action and Search Report for Russian Appl. No. 2019112866, dated Feb. 5, 2021.
Office Action and Search Report for Chinese Appl. No. 201780076434. 1, dated Apr. 14, 2020.

* cited by examiner

PROCESS FOR PREPARING POLYCARBONATES USING A CATALYST SYSTEM HAVING A QUARTERNARY NITROGEN COMPOND AND A QUARTERNARY PHOSPHOROUS COMPOUND

The present invention relates to a process for producing a polycarbonate by reaction of one or more diaryl carbonates with one or more aromatic hydroxy compounds, wherein a catalyst combination is used in the process. Moreover, the present invention relates to a catalyst combination and the use of such a catalyst combination in a process for the production of polycarbonate.

Aromatic polycarbonate is an economically interesting plastic which has numerous applications owing to its good mechanical and optical properties. Applications can be found, for example, in the automotive industry, in medical technology as well as in the packaging industry, as well as many more.

At present, the manufacture of aromatic polycarbonate on an industrial scale is accomplished either by a surface process or by a melt process.

In the so-called surface process, an aromatic hydroxyl is reacted with phosgene, an aqueous alkali and a solvent to polycarbonate, with addition of a catalyst. The polycarbonate is obtained in solution and is subsequently concentrated in several purification steps.

In the melt process, at least one aromatic hydroxy compound, preferably bisphenol A, is reacted with at least one diaryl carbonate, preferably diphenyl carbonate, to give polycarbonate. For this purpose, the liquid raw material streams are mixed and reacted, with addition of catalysts, at increased temperature and reduced pressure to form polycarbonate.

The production of polycarbonates according to said melt transesterification process is known and described, for example, in "Schnell", Chemistry and Physics of Polycarbonates, Polymer Reviews, vol. 9, Interscience Publishers, New York, London, Sydney 1964; in D. C. Prevorsek, B. T. Debona and Y. Kersten, Corporate Research Center, Allied Chemical Corporation, Morristown, New Jersey 07960, "Synthesis of Poly(ester)carbonate Copolymers" in Journal of Polymer Science, Polymer Chemistry Edition, vol. 19, 75-90 (1980); in D. Freitag, U. Grigo, P. R. Müller, N. Nouvertne, BAYER AG, "Polycarbonates" in Encyclopedia of Polymer Science and Engineering, vol. 11, second edition, 1988, pages 648-718; and finally in Dres. U. Grigo, K. Kircher and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

The reaction occurring during the preparation of polycarbonates from bisphenols and diaryl carbonates is represented by the following equation:

Recently, the melt process has been increasingly used, as a result of the lower amount of effluent and since there is no need to use toxic phosgene.

In order to be able to produce a high quality polycarbonate, however, it is of utmost importance for the melt process to use raw materials of high purity and an appropriate catalyst system, A high quality polycarbonate consists mainly of linear chains of a desired chain length. An alteration from the linear chain structure and/or a larger polydispersity (Mw/Mn), result in altered mechanical and in particular rheological properties; this can have a negative effect on further processing.

It is therefore of utmost importance to use a suitable catalyst system which ensures both an optimum reaction rate and a high degree of conversion, and which has a high selectivity to produce a high quality polycarbonate.

As a result of more than 30 years of industrial production of aromatic polycarbonate by the melt process, there are numerous different approaches to addressing this problem.

It is generally known that alkaline earth and alkali metals are used as catalysts in the melt process, and these must be deactivated (US 3 02 272).

EP 0 435 124 describes the use of alkali salts and nitrogen compounds as catalysts in the melt process with subsequent addition of an acid.

U.S. Pat. No. 3,444,254 describes the use of quaternary nitrogen and phosphorus compounds as transesterification catalysts.

A disadvantage of the previous solution approaches, is that the correct choice of catalyst depends strongly on the chosen process or the setup of the process.

A further disadvantage of the previous processes, is that no optimal balance has yet been found between a conversion of the educts to the polycarbonate as completely as possible, as low a formation of by-products as possible and as high a stability of the final product as possible.

The object of the present invention is to overcome the above mentioned disadvantages of the prior art processes.

According to the invention, this object is achieved by a process for producing a polycarbonate by reaction of one or more diaryl carbonates with one or more aromatic hydroxy compounds, wherein in the process a catalyst combination is used which comprises: a first component (component 1) comprising one or more quaternary nitrogen compounds; a second component (component 2) comprising one or more quaternary phosphorus compounds; a third component (component 3) comprising one or more alkali metal compounds; and a fourth component (component 4) comprising one or more sulphur-containing organic compounds.

Surprisingly, it has been found that this specific combination of quaternary nitrogen compounds, quaternary phosphorus compounds, alkali metal compounds and a sulphur-containing organic compound, leads to a very efficient and economical conversion of the reactants to polycarbonate of high quality whilst at the same time to a high stability of the polycarbonate which is formed.

In a particularly preferred embodiment, the process according to the invention is designed such that the first component comprises one or more quaternary nitrogen compounds having the general structure $[(R)_4—N]^+[X]^-$, wherein R represents independently of each other: the same or different alkyl and/or aryl groups, and X— comprises inorganic or organic anions, in particular hydroxide, sulphate, carbonate, formate, benzoate, phenolate, wherein the first component comprises in particular one or more of the following compounds: tetramethylammonium hydroxide, tetraethylammonium hydroxide, tetrabutylammonium hydroxide, tetramethylammonium formate, tetraethylammonium formate, tetrabutylammonium formate, tetramethylammonium acetate, tetraethylammonium acetate, tetrabutylammonium acetate, tetramethylammonium fluoride, tetraethylammonium fluoride, tetrabutylammonium fluoride.

In a particularly preferred embodiment, the first component comprises tetraethylammonium hydroxide.

In a further preferred embodiment, the process according to the invention is designed such that the second component comprises one or more quaternary phosphorus compounds having the general structure $[(R)_4—P]^+[X]^-$, wherein R represents, independently of each other: the same or different alkyl and/or aryl groups, and X— comprises inorganic or organic anions, in particular hydroxide, sulfate, carbonate, formate, benzoate, phenolate, wherein the second component comprises in particular one or more of the following compounds: tetramethylphosphonium hydroxide, tetramethylphosphonium formate, tetramethylphosphonium acetate, tetramethylphosphonium benzoate, tetraethylphosphonium hydroxide, tetraethylphosphonium formate, tetraethylphosphonium acetate, tetraethylphosphonium benzoate, tetrabutylphosphonium hydroxide, tetrabutylphosphonium acetate, tetrabutylphosphonium benzoate, tetraphenylphosphonium hydroxide, tetraphenylphosphonium acetate, tetraphenylphosphonium phenolate, tetrabutylphosphonium acetate, tetramethylphosphonium tetraphenylborohydride, tetraphenylphosphonium bromide, tetraphenylphosphonium tetraphenylboranate, tetra (p-tert-butylphenyl) phosphonium diphenyl phosphate, triphenylbutylphosphonium phenolate, triphenylbutylphosphonium tetraphenylboranate, tetraphenylphosphonium chloride, tetraphenylphosphonium fluoride.

In a particularly preferred embodiment, the second component comprises tetraphenylphosphonium phenolate.

In a further preferred embodiment, the process of the invention is designed such that the third component comprises one or more of alkali metal compounds: alkali metal hydroxide, -carboxylic acids and the salts thereof and in the form of non-volatile organic and inorganic acids and the salts thereof, alkali metal phosphates, -phosphite, -sulphate, wherein the third component comprises in particular one or more of the following compounds: sodium hydroxide, potassium hydroxide, lithium hydroxide, sodium acetate, potassium acetate, lithium acetate, sodium carbonate, potassium carbonate, lithium carbonate, sodium bicarbonate, potassium bicarbonate, lithium bicarbonate, sodium methoxide, potassium methoxide, lithium methoxide, sodium ethoxide, potassium ethoxide, lithium ethoxide, sodium stearate, potassium stearate, lithium stearate, sodium phenolate, potassium phenolate, lithium phenolate, sodium bisphenolate, potassium bisphenolate, lithium bisphenolate, disodium bisphenolate, dipotassium bisphenolate, dilithium bisphenolate, sodium benzoate, potassium benzoate, lithium benzoate, sodium borohydride, potassium borohydride, lithium borohydride, sodium amide, potassium amide, lithium amide, sodium phosphate, disodium hydrogen phosphate, sodium dihydrogen phosphate, potassium phosphate, dipotassium hydrogen phosphate, potassium dihydrogen phosphate, lithium phosphate, dilithium hydrogen phosphate, lithium dihydrogen phosphate, sodium sulphate, sodium hydrogen sulphate, sodium potassium phosphate, sodium stannates, potassium stannates.

In a particularly preferred embodiment, the third component comprises disodium bisphenolate.

In a further preferred embodiment, the third component comprises dipotassium bisphenolate.

It is particularly preferred that the third component comprises disodium bisphenolate and dipotassium bisphenolate.

In a further preferred embodiment, the process according to the invention is designed such that the fourth component comprises one or more of the following sulphur-containing organic compounds: butyl p-toluenesulphonate, benzenesulphonic acid, benzenesulphonate, p-toluenesulphonic acid, p-toluenesulphonate, methylbenzenesulphonic acid, methylbenzenesulphonate, ethylbenzene benzenesulphonate, ethylbenzenesulphonic acid, n-butylbenzenesulphonate, n-butylbenzenesulphonic acid, phenylbenzenesulphonate, phenylbenzenesulphonic acid, methyl p-toluenesulphonic acid, methyl p-toluenesulphonate, ethyl p-toluenesulphonate, ethyl p-toluenesulphonic acid, n-butyl p-toluenesulphonate, n-butyl toluenesulphonic acid, octyl p-toluenesulphonic acid, octyl-p-toluenesulphonate, phenyl p-toluenesulphonate, phenyl p-toluenesulphonic acid, trifluoromethanesulphonate, trifluoromethanesulphonic acid, naphthalenesulphonate, naphthalenesulphonic acid, dimethylsulphonate, dimethylsulphonic acid, diethylsulphonate, diethylsulphonic acid.

In a particularly preferred embodiment, the fourth component comprises butyl p-toluenesulphonate.

Particularly good results are achieved when the process according to the invention is designed such that the first component comprises tetraethylammonium hydroxide, the second component comprises tetraphenylphosphonium phenolate, the third component comprises disodium bisphenolate and the fourth component comprises butyl p-toluenesulphonate.

In a particularly preferred embodiment, the first component consists of tetraethylammonium hydroxide, the second component consists of tetraphenylphosphonium phenolate, the third component consists of disodium bisphenolate and the fourth component consists of butyl p-toluenesulphonate.

In a further preferred embodiment, the process of the invention is designed such that the first component comprises tetraethylammonium hydroxide, the second component comprises tetraphenylphosphonium phenolate, the third component comprises a sodium compound and a potassium compound and the fourth component comprises butyl p-toluenesulphonate.

In a further preferred embodiment, the process according to the invention is designed such that the first component comprises tetraethylammonium hydroxide, the second component comprises tetraphenylphosphonium phenolate, the third component comprises dipotassium bisphenolate and the fourth component comprises butyl p-toluenesulphonate.

In a further preferred embodiment, the process according to the invention is designed such that the first component comprises tetraethylammonium hydroxide, the second component comprises tetraphenylphosphonium phenolate, the third component comprises disodium bisphenolate and dipotassium bisphenolate and the fourth component comprises butyl p-toluenesulphonate.

Tetraethylammonium hydroxide (TEAH) has the formula $[(C_2H_5)_4N(OH)]+H_2O$ and has the CAS no. 77-98-5. The component is preferably used as a methanol-based solution (25% by weight of TEAH in MeOH). The first component of the catalyst system, preferably tetraethylammonium hydroxide, is preferably employed in an amount such that the target concentration of the component, based on the mass of the final polymer, is about 10-1000, in particular about 50-250, more preferably about 100-180, still more preferably about 120-150 ppm (by mass).

The second component of the catalyst system is preferably tetraphenylphosphonium phenolate (T-PPP). T-PPP has the molecular formula $C_{30}H_{25}OP$ and has the CAS no. 15464-47-8. The compound is preferably dissolved in diphenyl carbonate and added in liquid form to the reaction mixture. The second component of the catalyst system, especially in the form of tetraphenylphosphonium phenolate, is preferably used in an amount such that the target concentration of the component, based on the mass of the final polymer, is about 0.2-50, in particular about 1-15, more preferably about 2-12, still more preferably about 4-10 ppm (based on the mass).

The third component of the catalyst system is preferably disodium bisphenolate. Disodium bisphenolate has the molecular formula $C_{15}H_{14}O_2Na_2$ and has the CAS no. 2444-90-8. Disodium bisphenolate is preferably dissolved in DPC and added in liquid form to the reaction. The third component of the catalyst system, i.e. preferably disodium bisphenolate, is preferably used in an amount such that it is present in a target concentration of the component, based on the mass of the final polymer and the alkali metal, of about 0.005-2, in particular about 0.05-about 1, preferably about 0.05-0.7, more preferably about 0.09-0.3 ppm (based on the mass).

For the preferred embodiment, in which the third component comprises disodium bisphenolate and dipotassium bisphenolate, the disodium bisphenolate is preferably used in amounts such that it is present in a target concentration of the component, based on the mass of the final polymer and the alkali metal, of about 0.005-2, in particular about 0.01-about 1, preferably about 0.01-0.7, more preferably about 0.01-0.1 ppm (based on the mass) and that the dipotassium bisphenolate is preferably used in amounts such that it is present in a target concentration of the component, based on the mass of the final polymer and the alkali metal, of about 0.005-2, in particular about 0.01-about 1, preferably about 0.02-0.7, more preferably about 0.03-0.5 ppm (by mass).

The fourth component of the catalyst system is preferably butyl p-toluenesulphonate. Butyl p-toluenesulphonate has the molecular formula $C_{11}H_{16}O_3S$ and has the CAS no. 778-28-9. The fourth component of the catalyst system, i.e. preferably butyl p-toluenesulphonate, is preferably used in an amount such that the amount of the fourth component is about 1.1-3 times, in particular about 1.5-2 times, the molar ratio, based on the used amount of component three of the catalyst system. Thus, the molar ratio of the sulphur-containing organic compound used as the fourth component, with respect to the alkali metal used in the form of the third component (which is, in particular, in the form of sodium), is preferably about 1.1-3, more preferably about 1.5-2.

It is particularly advantageous if the process according to the invention is carried out in such a way that: the addition of the individual components of the catalyst combination is assigned to different reaction sections and in, particular, also to different reactors.

Particularly good results are achieved if the process according to the invention is carried out by initially adding the first component, at a later time adding the second and third components simultaneously and then adding the fourth component at a later time.

In the production of polycarbonates by the melt process, typically three reaction sections are distinguished, namely: the transesterification, the pre-polycondensation and the polycondensation.

In a particularly preferred embodiment, the process according to the invention is therefore designed such that the process comprises at least the following steps:
a) transesterification of one or more diaryl carbonates with one or more aromatic hydroxy compounds in at least one transesterification reactor,
b) pre-polycondensation of the reaction product of the transesterification in at least one pre-polycondensation reactor,
c) polycondensation of the reaction product of the pre-polycondensation in at least one polycondensation reactor.

In the transesterification, the diaryl carbonate and the aromatic hydroxy compound is mainly to be converted to a molecule with the smallest possible chain (chain length=1).

In the pre-polycondensation, the product of the oligomers or polymers, respectively, is to be reacted, which have a chain length that does not correspond to the desired final chain length.

In the polycondensation, the product of the pre-polycondensation is converted into the desired final chain length or into the final polycarbonate, respectively.

Due to the three different reaction sections and the respective different requirements of the reaction associated therewith, differently matched catalysts are advantageous.

In a particularly preferred embodiment, the process according to the invention is designed such that the first component is added before or during the transesterification (step a)), the second and third components are added after step a) and before or during the pre-polycondensation (step b)) and the fourth component is added after step b) and before or during the polycondensation (step c)).

In a particularly preferred embodiment, the inventive process is designed so that the first and second components are added up to a degree of conversion of the aromatic hydroxy compound of 99%, and the third component is added from a degree of conversion of the aromatic hydroxy compound of greater than or equal to 99%.

In a preferred embodiment, the inventive process is carried out so that the reaction product of the polycondensation is mixed with additives.

In a preferred embodiment, the process according to the invention is carried out such that the first component is added before or during the transesterification (step a)), the second and third components are added after step a) and before or during the pre-polycondensation (step b)) and the fourth component is added after step b) and before or during the addition of additives.

In principle, all suitable aromatic hydroxy compounds and all diaryl carbonates are conceivable as reactants for the process according to the invention.

In a particularly preferred embodiment, the process according to the invention is designed such that dihydroxy diarylalkanes of the formula HO—Z—OH are used as the aromatic hydroxy compound, wherein Z is a divalent organic radical having 6 to 30 carbon atoms and containing one or more aromatic groups.

In a further particularly preferred embodiment, the process according to the invention is designed such that di-($C_6$ to $C_{14}$ aryl) carbonic acid esters are used as diaryl carbonate.

Particularly good results are achieved if bisphenol A is used as aromatic hydroxy compound and diphenyl carbonate as diaryl carbonate.

In a further particularly preferred embodiment, the inventive process is designed so that the reaction product of the polycondensation is mixed with additives to influence the final properties of the product. These additives may include: UV stabilizers, hydrolysis stabilizers, oxidative degradation stabilizers, thermal stabilizers, processing aids, flow aids, anti-static agents, colorants, pigments, flame retardants, impact modifiers, plasticizers, lubricants, endcappers, fillers, reinforcing agents, etc.

Stabilizers: These include, for example, sterically hindered phenols, secondary aromatic and sterically hindered amines and phosphites, phosphonites, thioethers and metal salts, 2-hydroxybenzophenones, oxalanilides, 2-hydroxyphenylbenzotriazoles, 2-hydroxyphenyltriazines, salicylates, formamidines, cinnamic acid esters, nickel complexes, hindered amines, 4-hydroxybenzoates, such as: butylhydroxytoluene, arylamines, octadecyl 3-(3,5-di-tert-butyl-4-hydroxyphenyl) propanoate, [3-[3-(3,5-di-tert-butyl-4-hydroxyphenyl) propanoyloxy]-2,2-bis [3-(3,5-di-tert-butyl-4-hydroxyphenyl) propanoyloxymethyl] propyl] 3-(3,5-di-tert-butyl-4-hydroxy-phenyl) propanoate, 2-[3,3-bis (3-tert-butyl-4-hydroxyphenyl) butanoyloxy] ethyl 3,3-bis (3-tert-butyl-4-hydroxyphenyl) butanoate, [2-[3-[1-[3-(3-tert-butyl-4-hydroxy-5-methylphenyl) propanoyloxy]-2-methylpropane-2-yl]-2,4,8,10-tetraoxaspiro [5.5] undecan-9-yl ]-2-methylpropyl] 3-(3-tert-butyl-4-hydroxy-5-methylphenyl) propanoate, 1,3,5-tris [(4-tert-butyl-3-hydroxy 2,6-dimethylphenyl) methyl]-1,3,5-triazinane-2,4,6-trione, 1,3,5-tris [(3,5-di-tert-butyl-4-hydroxyphenyl)-methyl]-1,3,5-triazinane-2,4,6-trione, (2R)-2,5,7,8-tetramethyl-2-[(4R, 8R)-4,8,12-trimethyltridecyl]-3,4-dihydrochromen-6-ol, 4-(2-phenylpropan-2-yl)-N-[4-(2-phenylpropan-2-yl)-phenyl ]-aniline, 3,4-dibutyl-5-(2,4-dimethylphenyl)-3H-1-benzofurane-2-one, N,N-dioctadecylhydroxylamine, tris (2,4-di-tert-butylphenyl) phosphite, [4-[4-bis (2,4-di-tert-butylphenoxy) phosphanylphenyl] phenyl] bis-(2,4-di-tert-butylphenoxy) phosphane, 3,9-bis (2,4-di-tert-butylphenoxy)-2,4,8,10-tetraoxa 3,9-diphosphaspiro-[5.5]-undecane, octadecyl 3-(3-octadecoxy-3-oxopropyl) sulfanylpropanoate, 1-(octadecyldisulfanyl) octadecane, (2-hydroxy-4-octoxyphenyl)-phenylmethanone, 2-(benzotriazol-2-yl)-4,6-bis (2-methylbutane-2-yl) phenol, 2-tert-butyl-6-(5-chlorobenzotriazol-2-yl)-4-methylphenol, 2,4-di-tert-butyl-6-(5-chlorobenzotriazol-2-yl) phenol, 2-(benzotriazol-2-yl)-4-methylphenol, 2-(benzotriazol-2-yl)-4-methyl 6-[2-methyl-3-[methyl-bis (trimethylsilyloxy) silyl] propyl] phenol, 2-(benzotriazol-2-yl)-4,6-bis (2-phenylpropane-2-yl) phenol, 6-[2,6-bis (2,4-dimethylphenyl)-1H-1,3,5-triazine-4-ylidene]-3-octoxycyclohexa-2,4-dien-1-one, (6Z)-6-(4,6-diphenyl-1H-1,3,5-triazine-2-ylidene)-3-hexoxycyclohexa-2,4-dien-1-one, butan-1-amine; nickel(2+); 2-[2-oxido-5-(2,4,4-trimethyl-pentane-2-yl)-phenyl]-sulfanyl-4-(2,4,4-trimethyl-pentane-2-yl)-phenolate, bis (2,2,6,6-tetramethylpiperidine-4-yl) decanedioate, (2,2,6,6-tetramethylpiperidine-4-yl) octadecanoate, N-[6-[formyl-(2,2,6,6-tetramethylpiperidine-4-yl) amino] hexyl]-N-(2,2,6,6-tetramethylpiperidine-4-yl) formamide, 2-(4-methoxy-2,2,6,6-tetramethylpiperidine-1-yl) ethyl 4-oxopentanoate, 2-N-(2,2,6,6-tetramethylpiperidine-4-yl)-2-N-[6-[(2,2,6,6-tetramethylpiperidine 4-yl) amino] hexyl]-4-N-(2,4,4-trimethylpentane-2-yl)-1,3,5-triazine-2,4-diamine, N,N'-bis (2,2,6,6-tetramethylpiperidine-4-yl) hexane-1,6-diamine; 4-(4,6-dichloro-1,3,5-triazine-2-yl)-morpholine, 6-N-[3-[[4,6-bis (butyl-(1,2,2,6,6-pentamethylpiperidine-4-yl) amino]-1,3,5-triazine-2-yl]-2-[4,6-bis [butyl (1,2,2,6,6-pentamethylpiperidine-4-yl) amino]-1,3,5-triazine-2-yl]-[3-[[4,6-bis [butyl (1,2,2,6,6-pentamethylpiperidine-4-yl) amino]-1,3,5-triazine-2-yl] amino] propyl] amino] ethyl] amino] propyl]-2-N,4-N-di-butyl-2-N, 4-N-bis (1,2,2,6,6-pentamethylpiperidine-4-yl)-1,3,5-triazine-2,4,6-triamine, 2-oxohexamethyleneimine, 1,4-bis (2-methylanilino) anthracene-9,10-dione, [4-[4-bis (2,4-di-tert-butylphenoxy) phosphanylphenyl] phenyl] bis (2,4-di-tert-butylphenoxy) phosphane, phthalocyanine, diurethane dimethacrylate, 1,4-bis (mesitylamino) anthraquinone, tetraethyl 2,2'-(1,4-phenylenedimethylylidene) dimalonate, 2-(4,6-diphenyl-1,3,5-triazine-2-yl)-5-(hexyloxy) phenol, 2,2-bis (((2-cyano-3,3-diphenylacryloyl) oxy) methyl) propane-1,3-diyl bis(2-cyano-3,3-diphenylacrylate), 5-tert-butyl-2-[5-(5-tert-butyl-1,3,3-benzoxazol-2-yl) thiophen-2-yl]-1,3-benzoxazole, 1,2-bis (4-(benzo [d] oxazole-2-yl) phenyl) ethene, titanium dioxide, iron oxide, zinc oxide, bis (2,2,6,6-tetramethyl-4-piperidyl) sebacate, phenyltriazines, oxalanilides, benzotriazoles, benzophenones, 2,2,6,6-tetramethylpiperidine, 2-(2H-benzotriazol-2-yl)-4,6-bis (1-methyl-1-phenylethyl) phenol, organo-phosphites, octadecyl 3-(3,5-di-tert-butyl-4-hydroxyphenyl) propanoate.

Flame protection: These include inorganic and organic compounds such as aluminum trihydroxide, magnesium hydroxide, antimony trioxide, antimony pentoxide, sodium antimonate, zinc borate, ammonium polyphosphate, iron oxide, brominated polystyrene, TBBPA, phosphorus trihydride, dimethylmethylphosphonate, pentabromodiphenyloxide, diphenyldecyl phosphate, tetrabromobisphenol A, salts of aromatic sulphonic acids, phosphoric acid esters, 9,10-dihydro-9-oxa-10-phosphaphenanthrene 10-oxides, triphenyl phosphate, resocinol phosphate, bisphenol A bis(diphenyl) phosphate.

Colorants: These include inorganic and organic substances such as titanium dioxide, iron oxide, chromium oxide, ultramarine blue, nickel (II) phthalocyanines, bis [4-(dimethylamino) phenyl]-[4-(N-methylanilino) naphthalene-1-yl] methanol, copper phthalocyanine, copper (II) phthalocyanine, 1,4-bis (mesitylamino) anthraquinone.

Flow improvers: These include stearic, 12-hydroxystearic, palmitic, behenic acid, cetyl alcohol, stearyl alcohol, metal stearates, butyl stearate, tridecyl stearate, glycerol monostearate, glycerol monoricinolate, glycerol monooleate, glycerol tristearate, glycerol tri-12-hydroxystearate, trimethylolpropane tristearate, pentaerythritol tetrastearate, fatty acids and fatty acid esters, isostearamide, oleamide, erucamide, ethylenebisstearylamide, distearyl adipate, distearyl phthalate, cetyl palmitate, cetyl stearate, stearyl stearate, bephenyl behenate, such as, for example, octadecane-1-ol, 1,1,1-tris (4-hydroxyphenyl) ethane, 2-octyldodecyl octadecanoate, stearic acid, 2-octyldodecyl octadecanoate, pentaerythritol tetrastearate.

However, it should be appreciated by those skilled in the art that all additives can be selected from the commonly known and commercially available materials on the market, such as those described, for example, in Wolf, R. and Kaul, B. L. 2000. Plastics, Additives. Ullmann's Encyclopedia of Industrial Chemistry, Wiley-VCH Verlag GmbH & Co. [DOI: 10.1002/14356007.a20_459].

In a preferred embodiment, the process according to the invention is carried out so that one or more additive(s) are added in a polycarbonate main stream.

In a further preferred embodiment, the process according to the invention is carried out so that one or more additive(s) are added in a polycarbonate side stream.

In a preferred embodiment, the additives are added using an extruder.

The present invention also relates to a catalyst combination, in particular for use in a process for producing polycarbonate, comprising: a first component (component 1) comprising one or more quaternary nitrogen compounds, a second component (component 2) comprising one or more of quaternary phosphorus compounds, a third component (component 3) comprising one or more alkali metal compounds and a fourth component (component 4) comprising one or more sulphur-containing organic compounds.

In a preferred embodiment, the catalyst combination of the invention is designed such that the first component comprises one or more quaternary nitrogen compounds having the general structure $[(R)_4-N]^+[X]^-$, wherein R represents independently of each other, the same or different alkyl and/or aryl groups, and X— comprises inorganic or organic anions, in particular hydroxide, sulphate, carbonate, formate, benzoate, phenolate, wherein the first component comprises in particular one or more of the following compounds: tetramethylammonium hydroxide, tetraethylammonium hydroxide, tetrabutylammonium hydroxide, tetramethylammonium formate, tetraethylammonium formate, tetrabutylammonium formate, tetramethylammonium acetate, tetraethylammonium acetate, tetrabutylammonium acetate, tetramethylammonium fluoride, tetraethylammonium fluoride, tetrabutylammonium fluoride.

In a particularly preferred embodiment, the first component comprises tetraethylammonium hydroxide.

In a preferred embodiment, the catalyst combination of the invention is such that the second component comprises one or more quaternary phosphorus compounds having the general structure $[(R)_4-P]^+[X]^-$, wherein R represents, independently of each other, the same or different alkyl and/or aryl groups, and X— comprises inorganic or organic anions, in particular hydroxide, sulphate, carbonate, formate, benzoate, phenolate, wherein the second component comprises in particular one or more of the following compounds: tetramethylphosphonium hydroxide, tetramethylphosphonium formate, tetramethylphosphonium acetate, tetramethylphosphonium benzoate, tetraethylphosphonium hydroxide, tetraethylphosphonium formate, tetraethylphosphonium acetate, tetraethylphosphonium benzoate, tetrabutylphosphonium hydroxide, tetrabutylphosphonium acetate, tetrabutylphosphonium benzoate, tetraphenylphosphonium hydroxide, tetraphenylphosphonium acetate, tetraphenylphosphonium phenolate, tetrabutylphosphonium acetate, tetramethylphosphonium tetraphenylborohydride, tetraphenylphosphonium bromide, tetraphenylphosphonium tetraphenylboranate, tetra (p-tert-butylphenyl) phosphonium diphenyl phosphate, triphenylbutylphosphonium phenolate, triphenylbutylphosphonium tetraphenylboranate, tetraphenylphosphonium chloride, tetraphenylphosphonium fluoride.

In a particularly preferred embodiment, the second component comprises tetraphenylphosphonium phenolate.

In a preferred embodiment, the catalyst combination of the invention is such that the third component comprises one or more of the following alkali metal compounds: alkali metal hydroxide, -carboxylic acids and the salts thereof and in the form of non-volatile organic and inorganic acids and the salts thereof, alkali metal phosphates, -phosphite, -sulphate, wherein the third component comprises in particular one or more of the following compounds: sodium hydroxide, potassium hydroxide, lithium hydroxide, sodium acetate, potassium acetate, lithium acetate, sodium carbonate, potassium carbonate, lithium carbonate, sodium bicarbonate, potassium bicarbonate, lithium bicarbonate, sodium methoxide, potassium methoxide, lithium methoxide, sodium ethoxide, potassium ethoxide, lithium ethoxide, sodium stearate, potassium stearate, lithium stearate, sodium phenolate, potassium phenolate, lithium phenolate, sodium bisphenolate, potassium bisphenolate, lithium bisphenolate, disodium bisphenolate, dipotassium bisphenolate, dilithium bisphenolate, sodium benzoate, potassium benzoate, lithium benzoate, sodium borohydride, potassium borohydride, lithium borohydride, sodium amide, potassium amide, lithium amide, sodium phosphate, disodium hydrogen phosphate, sodium dihydrogen phosphate, potassium phosphate, dipotassium hydrogen phosphate, potassium dihydrogen phosphate, lithium phosphate, dilithium hydrogen phosphate, lithium dihydrogen phosphate, sodium sulphate, sodium hydrogen sulphate, sodium potassium phosphate, sodium stannates, potassium stannates.

In a particularly preferred embodiment, the third component comprises disodium bisphenolate.

In a particularly preferred embodiment, the third component comprises dipotassium bisphenolate.

It is particularly preferred that the third component comprises disodium bisphenolate and dipotassium bisphenolate.

In a preferred embodiment, the catalyst combination of the invention is such that the fourth component comprises one or more of the following sulphur-containing organic compounds: butyl p-toluenesulphonate, benzenesulphonic acid, benzenesulphonate, p-toluenesulphonic acid, p-toluenesulphonate, methylbenzenesulphonic acid, methylbenzenesulphonate, ethylbenzenesulphonate, ethylbenzenesulphonic acid, n-butylbenzenesulphonate, n-butylbenzenesulphonic acid, phenylbenzenesulphonate, phenylbenzenesulphonic acid, methyl p-toluenesulphonic acid, methyl p-toluenesulphonate, ethyl p-toluenesulphonate, ethyl p-toluenesulphonic acid, n-butyl p-toluenesulphonate, n-butyl toluenesulphonic acid, octyl p-toluenesulphonic acid, octyl-p-toluenesulphonate, phenyl p-toluenesulphonate, phenyl p-toluenesulphonic acid, trifluoromethanesulphonate, trifluoromethanesulphonic acid, naphthalenesulphonate, naphthalenesulphonic acid, dimethylsulphonate, dimethylsulphonic acid, diethylsulphonate, diethylsulphonic acid.

In a particularly preferred embodiment, the fourth component consists of butyl p-toluenesulphonate.

Particularly good results are achieved when the catalyst combination according to the invention is designed such that the first component comprises tetraethylammonium hydroxide, the second component comprises tetraphenylphosphonium phenolate, the third component comprises disodium bisphenolate and the fourth component comprises butyl p-toluenesulphonate.

In a particularly preferred embodiment, the catalyst combination of the invention is such that the first component consists of tetraethylammonium hydroxide, the second component consists of tetraphenylphosphonium phenolate, the third component consists of disodium bisphenolate and the fourth component consists of butyl p-toluenesulphonate.

The process according to the invention also relates to the use of the catalyst combination described in a process for the preparation of polycarbonate.

Figure 1:
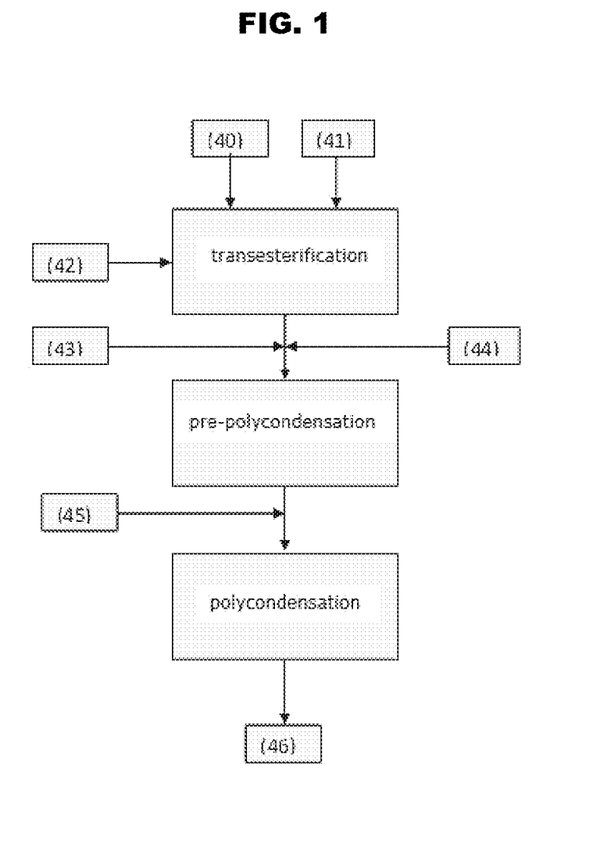
FIG. 1 shows a schematic representation of the process of the invention, in which the addition of the individual components of the catalyst combination takes place in individual reaction stages.

| No. | description |
|---|---|
| | FIG. 1 |
| 40 | diaryl carbonate component |
| 41 | aromatic hydroxyl component |
| 42 | first component |
| 43 | second component |
| 44 | third component |
| 45 | fourth component |
| 46 | polycarbonate melt |

Figure 2:
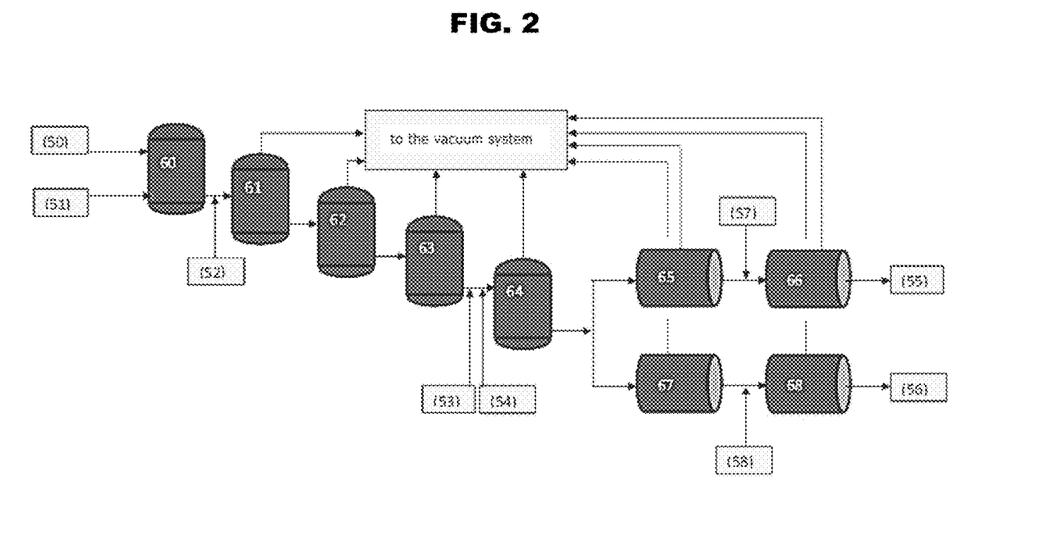

A particularly preferred embodiment of the method of the invention is shown in FIG. 2

| No. | description |
|---|---|
| | FIG. 2 |
| 50 | diaryl carbonate component |
| 51 | aromatic hydroxyl component |
| 52 | first component |
| 53 | second component |
| 54 | third component |
| 55 | polycarbonate melt line 1 |
| 56 | polycarbonate melt line 2 |
| 57 | fourth component line 1 |
| 58 | fourth component line 2 |
| 60 | raw material mixture container |
| 61 | transesterification reactor 1 |
| 62 | transesterification reactor 2 |
| 63 | transesterification reactor 3 |
| 64 | pre-polycondensation reactor 1 |
| 65 | pre-polycondensation reactor 2 line 1 |
| 66 | finish polycondensation reactor line 1 |
| 67 | pre-polycondensation reactor 2 line 2 |
| 68 | finish polycondensation reactor line 2 |

The raw material streams (50) and (51) are combined and mixed in a particular molar ratio of DPC to BPA of between 0.8 to 1.3, and are stored in a raw material mixture container (60) at a temperature of not more than 170° C. The raw material mixture is conveyed from the raw material mixture container into the first transesterification reactor (61), by means of a pump.

In the presence of the first component (52), and at a temperature of 180 to 260° C. and a pressure of 300 kPa (a) to 5 kPa (a), the raw materials are reacted.

Subsequently, the intermediate product from the transesterification reactor 1 (61) is conveyed in the transesterification reactor 2 (62) and further reacted at a temperature of 180 to 260° C., which is above the temperature of the previous reactor, and at a pressure of 300 kPa (a) to 5 kPa (a), which is lower than the pressure in the previous reactor.

Subsequently, the intermediate product is fed from the transesterification reactor 2 (62) to the transesterification reactor 3 (63) and further reacted at a temperature of 180 to 260° C., which is above the temperature of the previous reactor, and at a pressure of 300 kPa (a) to 5 kPa (a), which is lower than the pressure in the previous reactor.

The transesterification product from the transesterification reactor 3 (63) is fed to the next reaction section, or the pre-polycondensation reactor 1 (64), respectively. In addition, the second component (53) and the third component (54) are added. The reaction is carried out at a temperature of 210 to 260° C. and at a pressure of 10 kPa (a) to 1 kPa (a).

The intermediate product of the pre-polycondensation reactor 1 (64) is divided depending on the number of the following production lines, and is further reacted in the pre-polycondensation reactor 2 (65) or (67). The reaction is carried out at a temperature of 250 to 300° C. and at a pressure of 1 kPa (a) to 0.1 kPa (a).

Subsequently, the intermediate product from the pre-polycondensation reactor 2 (65) or (67) is fed into the polycondensation reactor (66) or (68) and the fourth component (57) or (58), respectively, is added. The intermediate product is reacted at a temperature of 280 to 310° C. and at a pressure of 1 kPa (a) to 0.01 kPa (a) to the desired final chain length.

The polycarbonate stream (55) or (56) fed from the polycondensation reactor is provided with additives and/or granulated in a further step.

The invention claimed is:

1. A process for producing a polycarbonate, the process comprising:
   reacting one or more diaryl carbonates with one or more aromatic hydroxy compounds, wherein in the process a catalyst combination is employed which comprises:
   a first component comprising one or more quaternary nitrogen compounds;
   a second component comprising one or more quaternary phosphorus compounds;
   a third component comprising one or more alkali metal compounds; and
   a fourth component comprising one or more sulphur-containing organic compounds;
   a) transesterification of one or more diaryl carbonates with one or more aromatic hydroxy compounds in at least one transesterification reactor;
   b) pre-polycondensation of the reaction product of the transesterification in at least one pre-polycondensation reactor; and
   c) polycondensation of the reaction product of the pre-polycondensation in at least one polycondensation reactor,
   wherein the first component is added before or during the transesterification (step a)), the third component is added after step a) and before or during the pre-polycondensation (step b)) and the fourth component is added after step b) and before or during the polycondensation (step c)).

2. The process according to claim 1, characterized in that first component comprises one or more of the following compounds: tetramethylammonium hydroxide, tetraethylammonium hydroxide, tetrabutylammonium hydroxide, tetramethylammonium formate, tetraethylammonium formate, tetrabutylammonium formate, tetramethylammonium acetate, tetraethylammonium acetate, tetrabutylammonium acetate, tetramethylammonium fluoride, tetraethylammonium fluoride, tetrabutylammonium fluoride;

or in that the second component comprises one or more of the following compounds:
   tetramethylphosphonium hydroxide, tetramethylphosphonium formate,
   tetramethylphosphonium acetate, tetramethylphosphonium benzoate,
   tetraethylphosphonium hydroxide, tetraethylphosphonium formate,
   tetraethylphosphonium acetate, tetraethylphosphonium benzoate,
   tetrabutylphosphonium hydroxide, tetrabutylphosphonium acetate, tetrabutylphosphonium benzoate, tetraphenylphosphonium hydroxide,
tetraphenylphosphonium acetate, tetraphenylphosphonium phenolate,
tetrabutylphosphonium acetate, tetramethylphosphonium tetraphenylborohydride,
tetraphenylphosphonium bromide, tetraphenylphosphonium tetraphenylboranate,
tetra (p-tert-butylphenyl) phosphonium diphenyl phosphate,
triphenylbutylphosphonium phenolate, triphenylbutylphosphonium
tetraphenylboranate, tetraphenylphosphonium chloride, tetraphenylphosphonium fluoride;
or
in that the third component comprises one or more of the following compounds: sodium
hydroxide, potassium hydroxide, lithium hydroxide, sodium acetate, potassium acetate, lithium acetate, sodium carbonate, potassium carbonate, lithium carbonate, sodium bicarbonate, potassium bicarbonate, lithium bicarbonate, sodium methoxide, potassium methoxide, lithium methoxide, sodium ethoxide, potassium ethoxide, lithium ethoxide, sodium stearate, potassium stearate, lithium stearate, sodium phenolate, potassium phenolate, lithium phenolate, sodium bisphenolate, potassium bisphenolate, lithium bisphenolate, di sodium bisphenolate, dipotassium bisphenolate, dilithium bisphenolate, sodium benzoate, potassium benzoate, lithium benzoate, sodium borohydride, potassium borohydride, lithium borohydride, sodium amide, potassium amide, lithium amide, sodium phosphate, disodium hydrogen phosphate, sodium dihydrogen phosphate, potassium phosphate, dipotassium hydrogen phosphate, potassium dihydrogen phosphate, lithium phosphate, dilithium hydrogen phosphate, lithium dihydrogen phosphate, sodium sulphate, sodium hydrogen sulphate, sodium potassium phosphate, sodium stannates, potassium stannates.

3. The process according to claim 1, characterized in that the third component comprises a potassium salt.

4. The process according to claim 1, characterized in that the third component comprises disodium bisphenolate and dipotassium bisphenolate.

5. The process according to claim 1, characterized in that the fourth component comprises one or more of the following sulphur-containing organic compounds: butyl p-toluenesulphonate, benzenesulphonic acid, benzenesulphonate, p-toluenesulphonic acid, p-toluenesulphonate, methylbenzenesulphonic acid, methylbenzenesulphonate, ethylbenzenesulphonate, ethylbenzenesulphonic acid, n-butylbenzenesulphonate, n-butylbenzenesulphonic acid, phenylbenzenesulphonate, phenylbenzenesulphonic acid, methyl p-toluenesulphonic acid, methyl p-toluenesulphonate, ethyl p-toluenesulphonate, ethyl p-toluenesulphonic acid, n-butyl p-toluenesulphonate, n-butyl toluenesulphonic acid, octyl p-toluenesulphonic acid, octyl-p-toluenesulphonate, phenyl p-toluenesulphonate, phenyl p-toluenesulphonic acid, trifluoromethanesulphonate, trifluoromethanesulphonic acid, naphthalenesulphonate, naphthalenesulphonic acid, dimethyl sulphonate, dimethyl sulphonic acid, diethylsulphonate, diethylsulphonic acid.

6. The process according to claim 1, characterized in that the first component comprises tetraethylammonium hydroxide, the second component comprises tetraphenylphosphonium phenolate, the third component comprises disodium bisphenolate and the fourth component comprises butyl p-toluenesulphonate;
or
in that the first component comprises tetraethylammonium hydroxide, the second component comprises tetraphenylphosphonium phenolate, the third component comprises a sodium compound and a potassium compound and the fourth component comprises butyl p-toluenesulphonate;
or
in that the first component comprises tetraethylammonium hydroxide, the second component comprises tetraphenylphosphonium phenolate, the third component comprises dipotassium bisphenolate and the fourth component comprises butyl p-toluenesulphonate.

7. The process according to claim 1, characterized in that the first component comprises tetraethylammonium hydroxide, the second component comprises tetraphenylphosphonium phenolate, the third component comprises disodium bisphenolate and dipotassium bisphenolate and the fourth component comprises butyl p-toluenesulphonate.

8. The process according to claim 7, characterized in that the disodium bisphenolate is used in such amounts that the disodium bisphenolate is present in a target concentration of the component, based on the mass of the final polymer and the alkali metal, of about 0.005-2 ppm and that the dipotassium bisphenolate is used in such amounts that the dipotassium bishphenolate is present in a target concentration of the component, based on the mass of the final polymer and the alkali metal, of about 0.005-2.

9. The process according to claim 1, characterized in that
the first component is used in an amount such that a target concentration of the component, based on the mass of the final polymer, is about 10-1000;
the second component is used in an amount such that a target concentration of the component, based on the mass of the final polymer, is about 0.2-50;
the third component is used in an amount such that a target concentration of the component, based on the mass of the final polymer and the alkali metal, is about 0.005-2; and
the fourth component-is used in such an amount that the amount of the component is about 1.1-3 times the molar ratio based on the amount of the third component of the catalyst system used,
or
characterized in that
the first component is used in an amount such that a target concentration of the component, based on the mass of the final polymer, is about 10-1000;
the second component is used in an amount such that a target concentration of the component, based on the mass of the final polymer, is about 0.2-50;
the third component is used in an amount such that a target concentration of the component, based on the mass of the final polymer and the alkali metal, is about 0.005-2 ppm; and
the fourth component is used in an amount such that the amount of the component is about 1.1-3 times the molar ratio based on the amount of the third component of the catalyst system used.

10. The process according to claim 1, characterized in that the component 2 is added after step a) and before or during the pre-polycondensation (step b)).

11. The process according to claim 1, characterized in that the reaction product of the polycondensation is mixed with additives.

12. The process according to claim 1, characterized in that the first component is added before or during the transesterification (step a)), the second and third components are added after step a) and before or during the pre-polycondensation (step b)) and the fourth component is added after step b) and before or during an addition of additives.

13. The process according to claim 1, characterized in that the aromatic hydroxy compound is the compound of formula HO—Z—OH, wherein Z is a divalent organic radical having 6 to 30 carbon atoms and containing one or more aromatic groups;
or
in that di-($C_6$ to $C_{14}$ aryl) carbonic acid esters are used as diaryl carbonate;
or
in that bisphenol A is used as aromatic hydroxy compound and diphenyl carbonate as diaryl carbonate.

14. The process according to claim 1, characterized in that one or more additive(s) are added in a polycarbonate main stream;
or
in that one or more additive(s) are added in a polycarbonate side stream.

15. The process according to claim 1, characterized in that the third component comprises one or more of the following compounds: potassium hydroxide, potassium bisphenolate, dipotassium bisphenolate.

* * * * *